United States Patent
Lagin

(10) Patent No.: US 12,545,204 B2
(45) Date of Patent: Feb. 10, 2026

(54) BUMPER CROSSMEMBER AND VEHICLE PROVIDED THEREWITH

(71) Applicant: Kirchhoff Automotive Deutschland GmbH, Attendorn (DE)

(72) Inventor: Stephan Lagin, Attendorn (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 456 days.

(21) Appl. No.: 18/249,822

(22) PCT Filed: Oct. 8, 2021

(86) PCT No.: PCT/EP2021/077852
§ 371 (c)(1),
(2) Date: Apr. 20, 2023

(87) PCT Pub. No.: WO2022/089916
PCT Pub. Date: May 5, 2022

(65) Prior Publication Data
US 2023/0406247 A1    Dec. 21, 2023

(30) Foreign Application Priority Data
Oct. 29, 2020    (DE) .................... 10 2020 128 492.6

(51) Int. Cl.
*B60R 19/04*    (2006.01)
*B60R 19/18*    (2006.01)
(Continued)

(52) U.S. Cl.
CPC .............. *B60R 19/18* (2013.01); *B60R 19/04* (2013.01); *B60R 19/24* (2013.01); *B60R 19/34* (2013.01);
(Continued)

(58) Field of Classification Search
CPC ... B60R 19/04; B60R 2019/247; B60R 19/18; B60R 19/1806; B60R 19/1813; B60R 2019/1806; B60R 19/24; B60R 19/34
(Continued)

(56) References Cited

U.S. PATENT DOCUMENTS 4,130,312 A  *  12/1978  Cooper, Sr. ............. B60R 19/04
293/153
8,950,794 B2    2/2015  Lenkenhoff
(Continued)

FOREIGN PATENT DOCUMENTS

DE    102017222081 A1    6/2019
FR       3093045 A1    8/2020

OTHER PUBLICATIONS

Office Action dated Jul. 2, 2025 in related Chinese application No. 202180072962.6.
(Continued)

*Primary Examiner* — Gregory A Blankenship
(74) *Attorney, Agent, or Firm* — Polson Intellectual Property Law P.C.; Margaret Polson; Christopher Sylvain

(57) ABSTRACT

A bumper crossmember having a profiled carrier profile, which extends with its longitudinal direction in the vehicle transverse direction (y direction) and has portions with a U-shaped profile in the z direction at least on the end sides formed by two limbs and a profile base connecting the two limbs, and a widening element profiled in the z direction, connected to each end side of the carrier profile, via which the carrier profile is extended in the longitudinal direction. Each widening element has a connecting portion, which has a U-shaped profile with a contact portion and a mating portion adjoining the contact portion, and an extension portion adjoining the mating portion. The connecting portion has a profile base connecting two limbs of the U-shaped profiling, engages with one of the two U-shaped portions of
(Continued)

the carrier profile, and is arranged overlapping the latter in the y direction. At least in the region of its contact portion, the connecting portion is connected to the profile base of the carrier profile, and in the region of its mating portion, the connecting portion makes contact at least in regions by way of its limbs with the limbs of the carrier profile.

15 Claims, 5 Drawing Sheets

(51) Int. Cl.
  *B60R 19/24* (2006.01)
  *B60R 19/34* (2006.01)
(52) U.S. Cl.
  CPC . *B60R 2019/1806* (2013.01); *B60R 2019/186* (2013.01); *B60R 2019/247* (2013.01)
(58) Field of Classification Search
  USPC .................................. 293/102, 114, 139, 154
  See application file for complete search history.

(56) References Cited

U.S. PATENT DOCUMENTS

| | | | |
|---|---|---|---|
| 9,446,799 B2 | 9/2016 | Franzpötter | |
| 9,598,100 B2 | 3/2017 | Lenkenhoff | |
| 9,764,764 B2 | 9/2017 | Irle | |
| 9,902,349 B2 | 2/2018 | Jordan | |
| 10,005,495 B2 | 6/2018 | Töller | |
| 10,577,025 B2 | 3/2020 | Michler | |
| 10,882,559 B2 | 1/2021 | Gündogan | |
| 11,142,248 B2 | 10/2021 | Günther | |
| 11,148,623 B2 | 10/2021 | Günther | |
| 11,235,720 B2 | 2/2022 | Höning | |
| 11,292,409 B2 | 4/2022 | Töller | |
| 11,505,146 B2 | 11/2022 | Weige | |
| 2015/0115633 A1* | 4/2015 | Braunbeck | B60R 19/24 293/153 |
| 2015/0151698 A1* | 6/2015 | Lee | B21D 53/88 293/120 |
| 2015/0298634 A1* | 10/2015 | Hara | B60R 19/04 293/133 |
| 2017/0106917 A1* | 4/2017 | Mashio | F16B 7/182 |
| 2017/0197572 A1* | 7/2017 | Fabiano | B60R 19/46 |
| 2017/0274849 A1 | 9/2017 | Jordan | |
| 2017/0274852 A1* | 9/2017 | Jordan | B60R 19/04 |
| 2019/0168700 A1* | 6/2019 | Lattorff | B60R 19/18 |
| 2019/0344385 A1 | 11/2019 | Töller | |
| 2020/0317149 A1* | 10/2020 | Höning | B60R 19/04 |
| 2022/0009435 A1 | 1/2022 | Günther | |
| 2022/0024399 A1 | 1/2022 | Tlauka | |
| 2022/0258684 A1 | 8/2022 | Günther | |
| 2022/0281532 A1 | 9/2022 | Tentscher | |
| 2022/0289304 A1 | 9/2022 | Weige | |
| 2022/0297524 A1 | 9/2022 | Günther | |
| 2022/0314912 A1 | 10/2022 | Töller | |
| 2022/0363211 A1 | 11/2022 | Günther | |
| 2023/0039843 A1 | 2/2023 | Gündogan | |
| 2023/0123267 A1 | 4/2023 | Günther | |
| 2023/0131692 A1 | 4/2023 | Lagin | |
| 2023/0166597 A1 | 6/2023 | Günther | |
| 2023/0202567 A1 | 6/2023 | Günther | |
| 2023/0406247 A1* | 12/2023 | Lagin | B60R 19/24 |
| 2024/0017690 A1* | 1/2024 | Takemoto | B60R 19/04 |

OTHER PUBLICATIONS

Pending U.S. Appl. No. 18/044,348, filed Mar. 7, 2023, inventors Gunther et al., applicant Kirchhoff Automotive Deutschland GmbH [Per MPEP 609.07, copy not provided as this is available in the USPTO system].
International Search Report mailed Dec. 23, 2021 in parent international application PCT/EP2021/077852.
Written Opinion of the International Searching Authority mailed Dec. 23, 2021 in parent international application PCT/EP2021/077852.
Examination report dated Jun. 12, 2024 in related German application No. 10 2020 128 492.6.
Summons to the hearing dated Oct. 11, 2024 in related German application No. 10 2020 128 492.6.

* cited by examiner

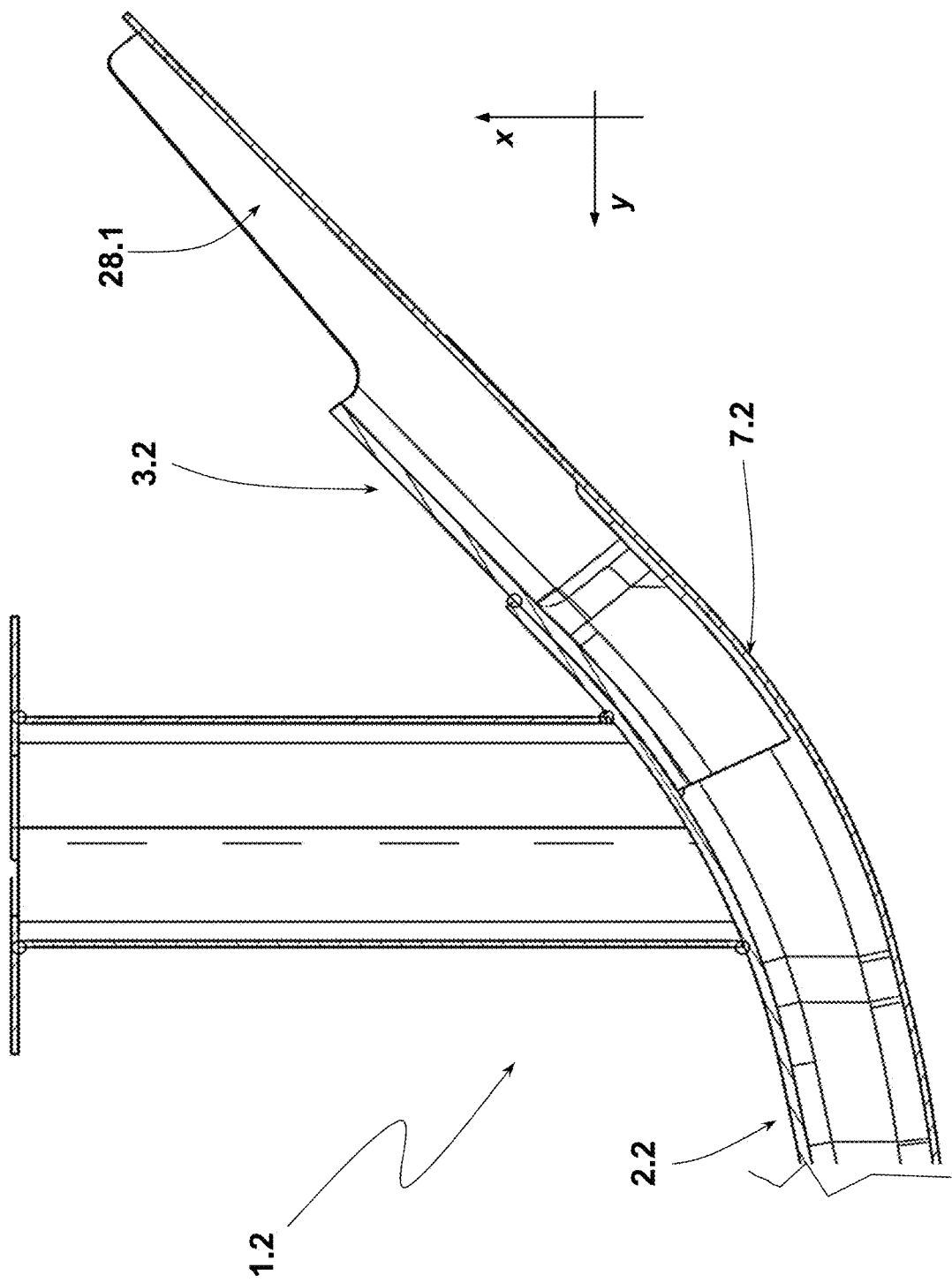

BUMPER CROSSMEMBER AND VEHICLE PROVIDED THEREWITH

BACKGROUND

The disclosure relates to a bumper crossmember having: a profiled carrier profile extending with its longitudinal direction in the transverse vehicle direction (y direction) with sections profiled in a U-shape in the z direction at least at the ends of the carrier profile formed by two legs and a profile base connecting the two legs; and a widening element profiled in the z direction, connected to each end of the carrier profile, via which the carrier profile is extended in the longitudinal direction (y direction); wherein each widening element has a U-shaped profiled connection section having a contact section; wherein the connection section has a profile base connecting two legs of the U-shaped profile and is engaged with one of the two U-shaped sections of the carrier profile and arranged overlapping therewith in the y direction; and—wherein the connection section is connected to the profile base of the carrier profile at least in the area of its contact section. A vehicle equipped with at least one such bumper crossmember is also described.

A bumper crossmember is known from U.S. Pat. No. 9,902,349 B2. An extension and a V-shaped bracket supported on a crash box and on a section of the extension is provided at the end of the crossmember.

A further bumper crossmember is known from DE 10 2017 222 081 A1. In this crossmember, the crossmember widening elements are placed abutting the ends of the carrier profile and are designed to extend the profiling of the carrier profile. Using the disclosed bumper crossmember, bumper crossmembers of different widths can be provided for different motor vehicles using the carrier profile as a common part. In this respect, such a bumper crossmember has a modular structure with its widening elements designed for different applications. For connecting to the carrier profile, the widening elements have tabs as profile extensions in the vehicle transverse direction (y direction), namely a middle tab for connecting to the carrier profile and an upper and lower tab for connecting the widening element to a crash box arranged on the carrier profile. This connection system enables quick and easy assembly of the crossmember widening elements with the carrier profile. A disadvantage of this bumper crossmember is that, especially under high loads such as a high-speed crash, the connection between the crossmember and the carrier profile is not sufficiently stable and the crossmember widening elements can tear off the carrier profile, which significantly increases both the damage to the vehicle and the risk of injury to vehicle occupants. It would also be desirable to have fewer restrictions on the design of the widening elements.

SUMMARY

One aspect of the disclosure is therefore based on refining a bumper crossmember of the type mentioned at the outset in such a way that it meets the requirements of different vehicle designs through the use of different widening elements, and in which the design freedom for different vehicles and crash situations is also increased in terms of adaptation.

This is achieved by a bumper crossmember of the type mentioned at the outset, wherein
each widening element has a fitting section adjoining the contact section and an extension section adjoining the fitting section, and wherein the connection section, in the region of its fitting section, at least partially contacts the legs of the carrier profile with its legs.

The directions used herein: x direction, y direction, and z direction correspond to the directions as they are usually used in vehicles. Accordingly, the x direction corresponds to the vehicle longitudinal extension, the y direction to the vehicle transverse direction, and the z direction to the direction of the vertical axis.

In this bumper crossmember, the connection between the widening element and the carrier profile takes place as a profile-in-profile solution, in which the connection section is arranged with its contact section and its fitting section overlapping with the profiled section in the end area of the carrier profile and is engaged therewith. Due to the high stability of the connection, the actual extension section provided for the extension of the carrier profile can be designed very individually, with regard to the geometric shape, the mechanical strength, or also the material. It is to be noted that the widening element is usually formed in one piece. However, the widening element can also be composed of multiple components.

In this profile-in-profile connection between the carrier profile and a widening element, the complementary profile sections are plugged into one another. For the connection of the widening element to the carrier profile, there is therefore no need to consider the arrangement of other elements for its connection to the carrier profile. For this reason alone, the design freedom of the designs of the widening element is significantly greater in relation to the prior art mentioned at the outset. The connection section can be arranged on the outside around the U-shaped profile of the carrier profile or on the inside thereof. This possibility also means that the design freedom in the design of such a widening element is less restricted than previous approaches. In one example embodiment, it is provided that the legs of the connection section in the area of its fitting section are each in contact with their outside with an inside of the legs of the carrier profile, and the outside of the profile base of the connection section facing away from the legs is connected, typically welded, at least in the area of the contact section to the inside of the profile base of the carrier profile. In this embodiment, the connection section of the widening element is located within the profiling of the carrier profile. In this case, the already existing cavity in the carrier profile is used, so that no additional installation space is required for the connection of such a widening element.

The U-profiled connection section of the widening element comprises a contact section and a fitting section. With regard to its U-shaped profile and thus the span and alignment of its legs, the fitting section is designed such that these contact the legs of the U-shaped profiled end section of the carrier profile. A fit for the connection to the carrier profile is thus provided by the fitting section. In contrast, the contact section, which is typically much longer than the fitting section and extends in the y direction, only has to be connected using its profile base to the profile base of the carrier profile. For this reason, the widening element can be fastened using its connection section to the carrier profile with a two-point fastening, wherein the two fastening points can be spaced far apart in the y direction, in accordance with the length of the connection section in the y direction. A first fastening point can be located, for example, on the free end face of the profile base of the contact section, at which point the widening element is typically joined to the profile base of the carrier profile by welding. The second fastening point is effectuated by the fit provided by the fitting section and only has to be secured against the direction in which the widening element is engaged using its connection section with the carrier profile, typically also by a weld, which can certainly be implemented at multiple points by spot welds. This concept allows the connection section of the widening element to be designed such that its connection section only abuts the carrier profile with a relatively small-area contact surface. In the area of the contact section, the legs of the connection section, which are provided for reinforcement, do not necessarily have to abut the legs of the carrier profile. The smaller the contact surface is between the two elements, the lower the risk of corrosion occurring between the two parts. If the legs of the contact section are spaced apart from those of the carrier profile, a corrosion protection layer applied, for example, via cathodic dip painting can also reach the sides facing toward one another of the legs of the two U-shaped profiled parts.

In one embodiment, in which the connection section of the widening element is located within the U-shaped profile of the carrier profile in its end section, a design of the contact section allows it to also be arranged so that it overlaps with the end face of a crash box connected to the rear of the carrier profile. In this way, a force acting on the bumper crossmember in the outer region can also be introduced at least partially into the crash box on the end face via the widening element.

Due to this connection of the widening element to the carrier profile, the actual extension section can be designed in virtually any way. In many cases, the U-shaped profile of the connection section will continue into the extension section. Thus, if desired, the extension section can also continue the profiling of the carrier profile in the y direction. However, the extension section can be used to extend the extension of the carrier profile in the y direction with other cross-sectional geometries. For example, the extent of the extension section in the z direction can exceed that of the carrier profile, either upwards and downwards or also only upwards or downwards. In addition, the extension section can also be profiled differently in the x direction in comparison to the carrier profile if a different deformation behavior is to be configured in the outer edge regions of the bumper crossmember. The end of the extension element facing away from the carrier profile in the y direction can represent the end of the bumper crossmember. There is certainly also the possibility of using such an extension element as an intermediate or connecting piece between the carrier profile and a separately produced bumper crossmember end piece. The latter is typically connected to the widening element by a joining process, but can also be connected thereto using mechanical connectors. Adhesive bonds are also possible.

The design of the widening element allows the carrier profile to be lengthened in the y direction without necessarily having to accept a weak point. Should it be desired, however, such a widening element can be designed having a predetermined buckling point, for example by weakening the material in the legs of the widening element, for example by corresponding notches or material recesses. As a result of the extent of the extension section in the y direction, such a predetermined buckling point can be configured at virtually any position in this section and is not restricted to the end of the carrier profile. In addition, the buckling axis of such a predetermined buckling point does not necessarily have to extend strictly in the z direction, even if this will be the case in many cases. If the material weakenings in the two legs, for example effectuated by recesses, are not aligned one above the other in the z direction, buckling of the outer section of the bumper crossmember in the direction toward the vehicle can also be combined with a component in the z direction.

In order to simplify the assembly of the two components and also to facilitate the application of an anti-corrosion layer, it is provided according to a refinement that the connection section has a slot-like recess following its longitudinal extension (y direction) in the region of its contact section. This is arranged in the profile base of the contact section. The contact surface between the two components is additionally reduced by the slot-like recess. At the same time, such a recess, which typically extends in the y direction, can be used to weld the profile base of the connection section to that of the carrier profile, preferably along at least one longitudinal side of such a slot-like recess. A weight reduction of the widening element is also achieved by such a recess.

According to one embodiment, the carrier profile is designed as a hat profile and the legs of the U-shaped profiled connection section of the widening element extend at least in sections up to the plane of the flanges that are erected in the z direction in relation to the U-shaped profiled section of the carrier profile. The carrier profile is closed using a closing plate. The closing plate is joined to the flanges of the carrier profile and the legs of the widening element in the area of its connection section and/or in the area of its extension section. In these sections, the closing plate thus provides a double box profile and thus a section of particularly high flexural strength.

Bringing the legs of the U-shaped profile of the extension section up to the closing plate can be used to simplify assembly of a closing plate. In such a case, the free ends of the legs of the widening element protrude up to the plane formed by the flange-like free ends of the carrier profile, so that they abut the closing plate and the closing plate can be supported thereon. To facilitate assembly, it is provided that the legs of the U-shaped profiled extension section protrude somewhat in sections in relation to the plane of the outer terminus of the carrier profile. These leg extensions can be used to fix a closing plate which engages with a section, such as a tab, between the two leg extensions. The closing plate contacts the two leg extensions with its tab pointing in the z direction and extending between the leg extensions and is thereby fixed in the z direction. Leg extensions of this type can also be used so that when the height (extension in the z direction) of the closing plate exceeds the distance between the leg extensions, it has corresponding openings in which the leg extensions engage. In both cases, not only is this closing plate section fixed in place, but the leg extensions also allow both parts to be joined from the front side of the closing plate.

In order to attach an additional extension element, the widening element can have two support arms which are arranged spaced apart from one another in the vertical direction (z direction) and extend in the longitudinal direction out of the legs and away from the carrier profile. The extension section is usually also formed in the shape of a hat in cross section. The support arms can be designed as legs extending in the longitudinal direction over the profile base. An additional extension element can be connected to the support arms. The support arms can also be used without an additional extension element if they are closed at the front side using a closing plate. Then the carrier profile extension is embodied reduced in weight.

Such a bumper crossmember can be optimally adapted with regard to the requirements of different crash tests. This applies to both the high-speed small overlap test and the mobile progressive deformable barrier test (MPDB test).

This adaptation can also be provided with regard to the arrangement and design of a predetermined buckling point. As already explained above, this can be provided by weakening the material in the extension section of the widening element. A predetermined buckling point also occurs where the contact section of the widening element ends, if it does not overlap with the end face of the crash box. In order to pass such a test, it is important for the bumper crossmember to have a high level of rigidity in the area of the widening elements. This is designed to meet the requirements of the relevant crash test(s), such as the high-speed small overlap test and the MPDB test. In order to achieve a precise buckling movement of the bumper crossmember that is required in a specific section of the widening element in such an accident, it is provided according to a refinement that the widening element has predetermined buckling points, as already outlined above, which are arranged in particular in the area of the extension section and allow a buckling movement of a buckling section of the extension section around a predetermined buckling axis aligned in the vertical direction (z direction). In this way, a very precise and targeted buckling movement can be induced in the widening element in the event of a crash, so that the widening element is adjusted in the x direction, namely around a buckling axis aligned in the vertical direction (z direction). It is possible to control the buckling movement, even under high loads, in such a way that the opposing vehicle continues to be guided past the subject vehicle.

BRIEF DESCRIPTION OF THE DRAWINGS

The disclosure is described in more detail hereinafter in the context of example embodiments with reference to the attached figures, wherein:

FIG. 7 shows a horizontal section through the bumper crossmember from FIG. 6.

DETAILED DESCRIPTION

Figure 1:
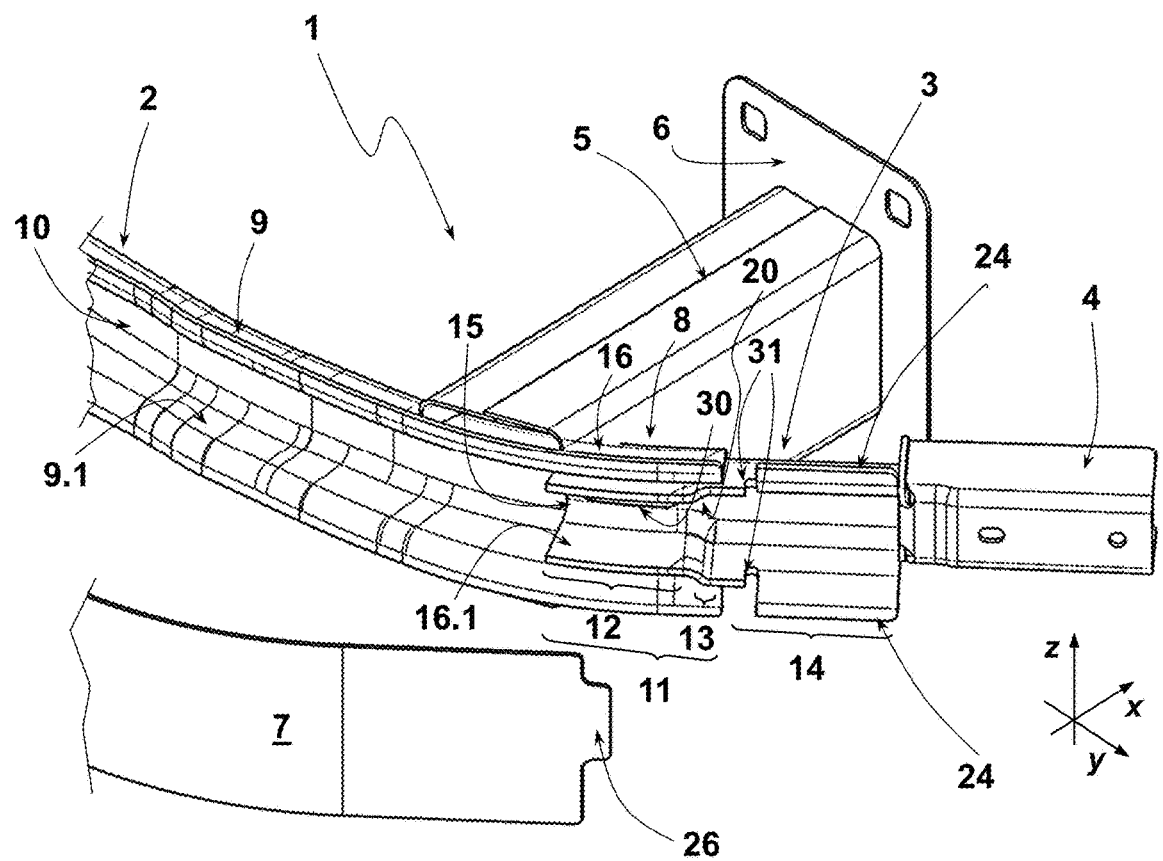
FIG. 1 shows a perspective view of a first embodiment of a bumper crossmember.

FIG. 1 shows a detail of a bumper crossmember 1, specifically in its end section facing to the left in the travel direction. In the example embodiment shown, the bumper crossmember 1 comprises a U-shaped profiled carrier profile 2, a likewise U-shaped profiled widening element 3, and a profiled extension element 4 connected to the widening element 3. A crash box 5 is connected to the rear side of the carrier profile 2 at a distance from its end terminus. At its connection end on the vehicle side, the crash box 5 carries a mounting plate 6 for connecting it to the vehicle. A closing plate 7, which represents the outer terminus of the carrier profile 2, is used to close the carrier profile on the front side. The other end section of the bumper crossmember 1 that is not shown in the figure is designed in exactly the same way as the one shown, so that the following explanations apply equally to the other end of the bumper crossmember 1.

The carrier profile 2 is profiled in a hat shape in cross section over its entire length and thus also in its end sections, so that in addition to its already mentioned U-shaped profile, it has flanges protruding from the legs in the z direction. The closing plate 7 is connected thereon. The U-shaped profiling of the support profile 2 comprises two legs 9, 9.1 and a profile base 10 connecting the two legs 9, 9.1. The widening element 3 is inserted with a connection section 11 in the end section 8 of the carrier profile 2 and thus engaged.

The connection section 11 of the widening element 3 comprises a contact section 12 and a fitting section 13 adjoining the contact section 12. An extension section 14 adjoins the connection section 11. While the connection section 11 with its contact section 12 and the fitting section 13 are arranged overlapping with the end section 8 of the carrier profile 2, the extension section 14 protrudes in the longitudinal direction (y direction) of the carrier profile 2 beyond the free end of the end section 8 of the carrier profile 2. The longitudinal extension of the carrier profile 2 is extended by the extension section 14, and therefore the bumper crossmember 1 is widened.

The widening element 3 is profiled essentially U-shaped in cross section and has two legs 16, 16.1 and a profile base 15 connecting the two legs 16, 16.1. In the area of the contact section 12, the widening element 3 is narrower in the vertical direction (z direction) than the fitting section 13 and the extension section 14. In the area of the extension section 14, the widening element 3 is profiled in a hat shape, in that flanges are provided formed on the free ends 24 of the legs 16, 16.1 in the z direction. The front side of these flanges is aligned with the flanges of the hat-shaped profile of the carrier profile 2.

The span of the legs 16, 16.1 of the widening element 3 in the area of its contact section 12 is less than in the fitting section 13 arranged adjacent thereto. The transition between the two leg widths is provided by a transition section 20 designed as a bend. The representation of FIG. 1 makes it clear that to compensate for tolerances, the widening element 3 can be configured with regard to the depth of its plunging into the profile of the carrier profile 2 (in the y direction), since the fitting section 13 merges into the extension section 14 without a change in the span of the legs 16, 16.1. In this regard, reference is also made to the illustration in FIG. 2. The viewing direction of the section is in the direction toward the carrier profile 2.

The profile base 15 of the contact section 12 and the fitting section 13 abuts the inside 22 of the profile base of the carrier profile 2 with its outside 21. In the area of the contact section 12, the profile bases 10, 15 are welded together (not shown). The crash box 5 is also welded (indicated by weld seams 29) to the carrier profile 2, which has a recess corresponding to the U-shaped profile on its end face facing toward the carrier profile 2.

Figure 2:
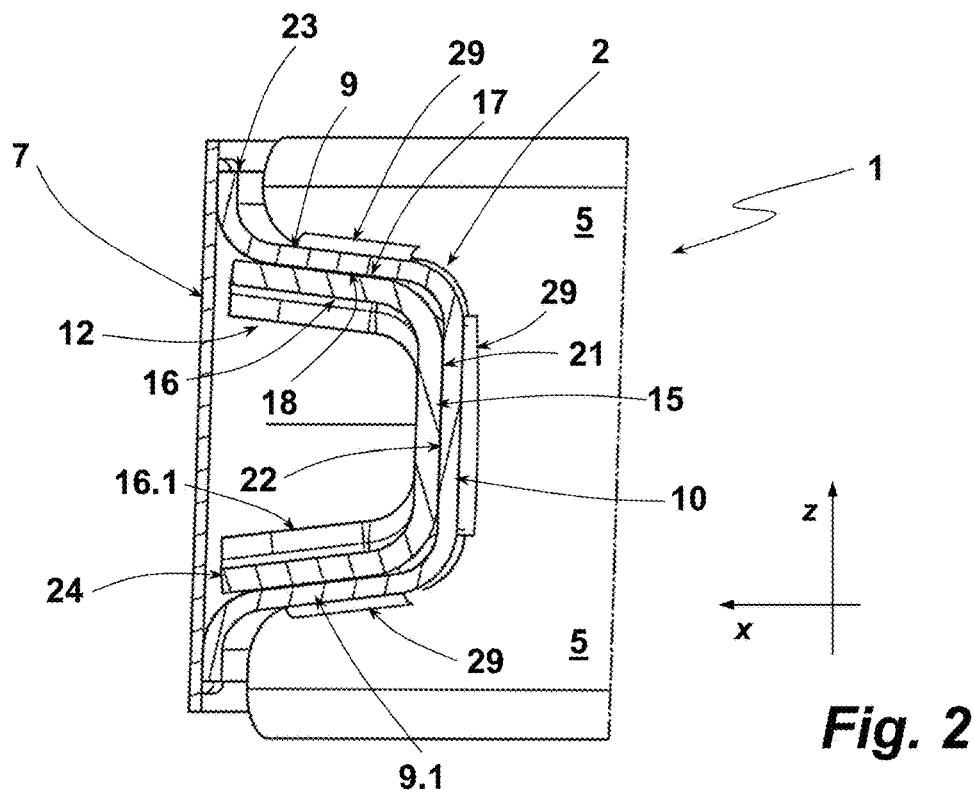
FIG. 2 shows a vertical section through the fitting section of the bumper crossmember from FIG. 1.

It is also apparent from FIG. 2 that the free ends 23 of the flanges of the carrier profile 2, which are bent over from the legs 9, 9.1, are connected to the closing plate 7 by a weld seam. The free ends 24 of the legs 16, 16.1 do not protrude up to the closing plate 7 in the illustrated example embodiment in the area of the connection section 11.

The widening element 3 of the depicted example embodiment has material recesses 31 introduced into the legs 16, 16.1 at opposite positions in the area of its extension section 14 (see FIG. 1). The two opposing material recesses 31 aligned with one another in the z direction form a buckling axis (not shown) extending in the vertical direction (z direction). If a force acting on the outside of the bumper crossmember 1 in the area of the material recesses 31 exceeds the holding torque provided, the widening element 3 buckles with the extension element 4 around the buckling axis formed by the material recesses 31 in the direction of the crash box 5. The material recesses 31 are apparent in the longitudinal section of the section of the bumper crossmember 1 shown in FIG. 3. This illustration shows the bumper crossmember 1 in a horizontal section. It is clearly apparent that in this example embodiment the contact section 12 of the widening element 3 extends in the longitudinal direction (y direction) up to the end face 25 of the crash box 5 and overlaps therewith. In this case, the contact section 12 does not completely overlap the end face 25, but rather only by approximately 30% of the extension of the crash box 5 in the y direction in the example embodiment shown.

Figure 3:
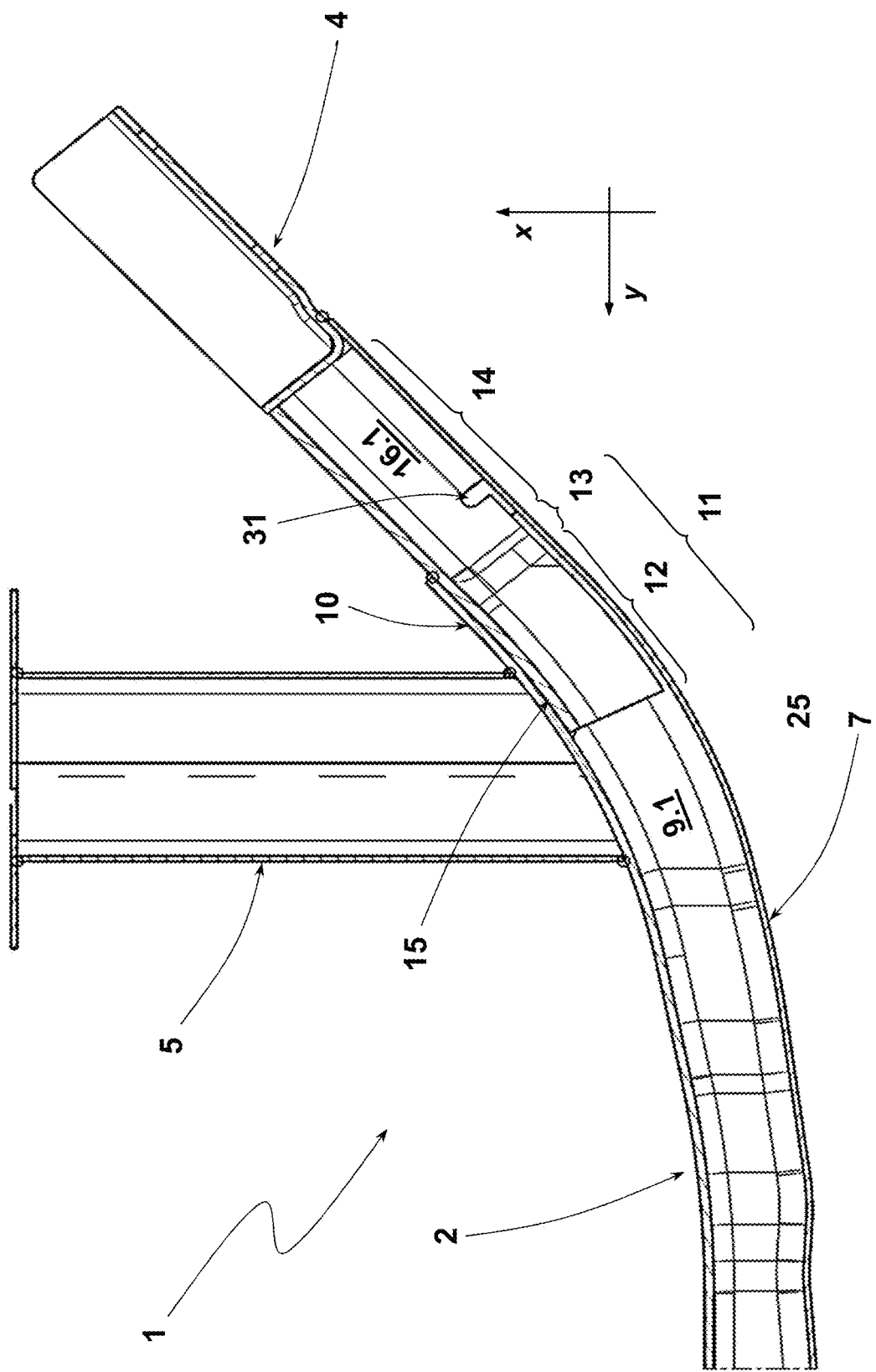
FIG. 3 shows a horizontal section through the bumper crossmember from FIGS. 1 and 2.

In the area of the extension section 14, the widening element 3 is formed hat-shaped in cross section as already explained above (see FIG. 2), so that the free ends 24 of the legs 16, 16.1 are present in the area of the extension section 14 as flanges extending in the z direction, to which the closing plate 7 is welded. As can be seen in FIG. 3, the closing plate 7 is not in contact in the area of the contact section 12 and the fitting section 13 with the free ends 24 of the legs 16, 16.1 of the widening element 3, but only at the free ends 24 of the legs 16, 16.1 in the area of the extension section 14. The closing plate 7 bears a tab 26 on its free end facing in the y direction, which tab overlaps with the extension element 4. This overlapping area of the extension element 4 is set back slightly in relation to its end extending towards the free end of the bumper crossmember 1, namely by the material thickness of the closing plate 7, so that the outside of the closing plate 7 is flush with the front side of the extension element 4 (see FIG. 3).

Figure 4:
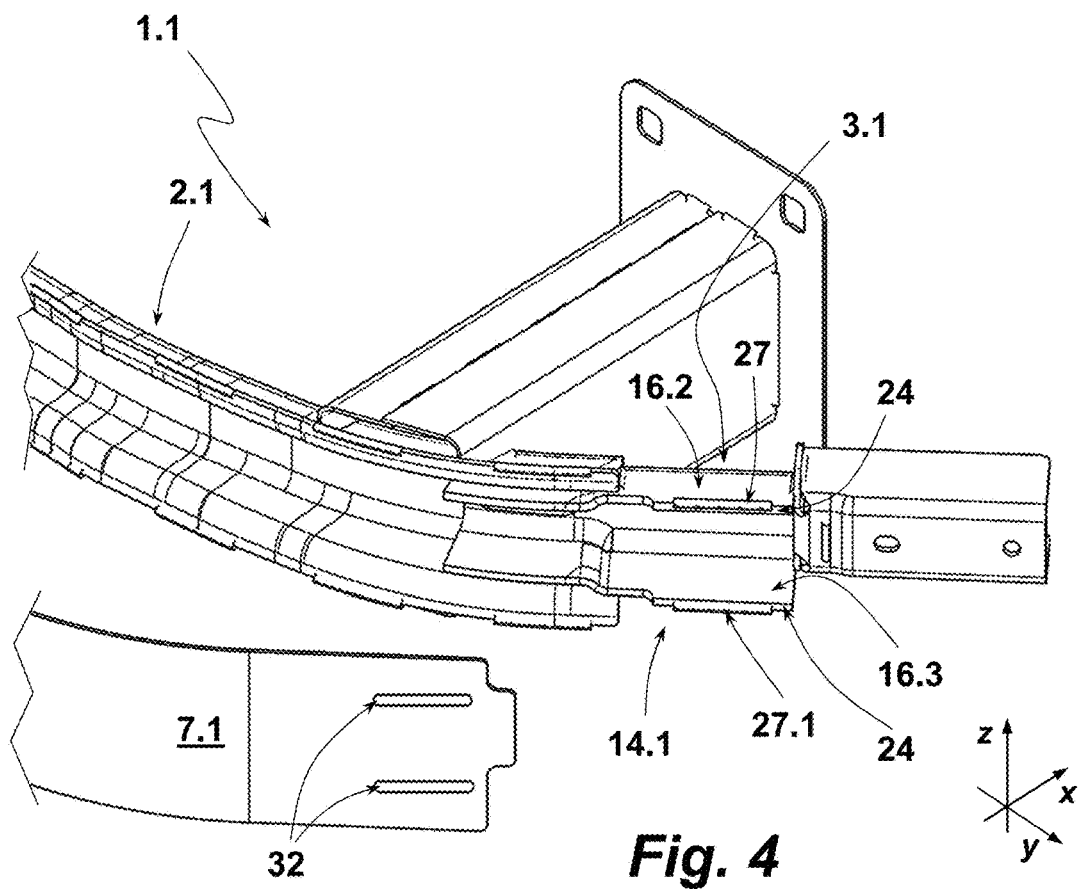
FIG. 4 shows a perspective view of a second embodiment of the bumper crossmember.

FIG. 4 shows a second example embodiment of a bumper crossmember 1.1. This embodiment, as well as that shown in FIGS. 5 and 6, largely corresponds to the example embodiment of the bumper crossmember 1 of FIGS. 1 to 3 and differs therefrom in the design of the extension section 14.1 of the widening element 3.1. In the embodiment in FIG. 4, the extension section 14.1 does not have a hat-shaped profile in cross section and therefore also does not have flange-like free ends on the legs. Instead, projections 27, 27.1 are arranged at the free ends of the legs 16.2, 16.3, by which the height of the legs 16.2, 16.3 is extended. These projections 27, 27.1 are used to fix the closing plate 7.1, which has an opening 32 in each case at the appropriate point for this purpose.

Figure 5:
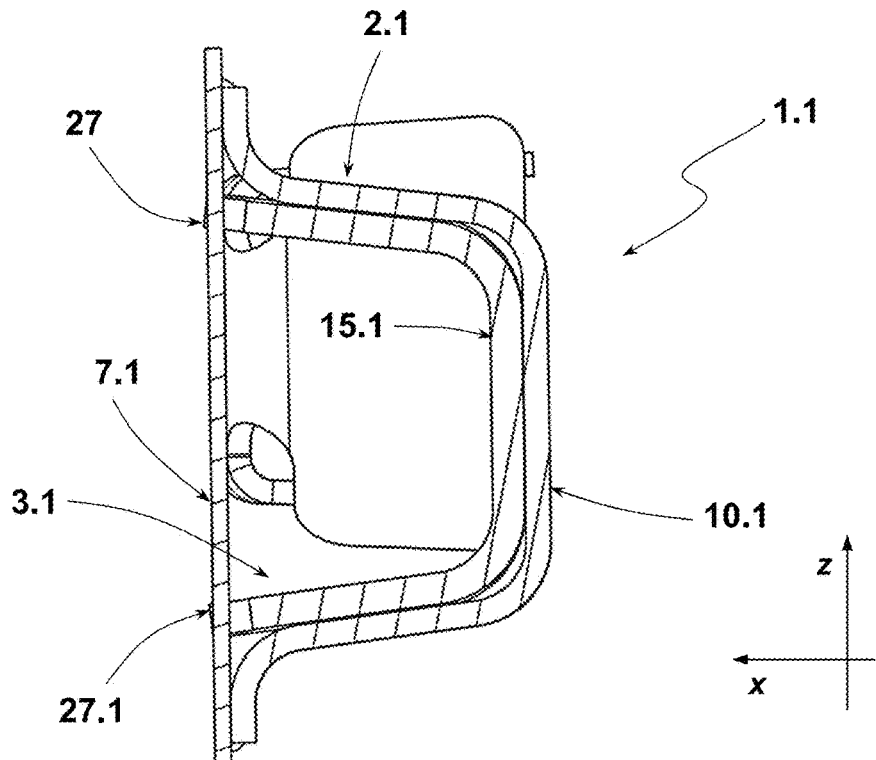
FIG. 5 shows a vertical section through the fitting section of the bumper crossmember from FIG. 4.

In this way, the assembly of the closing plate 7.1 is facilitated by exact positioning thereof by the engagement of the projections 27, 27.1 in the openings 32. The closing plate 7.1 is welded to the projections 27, 27.1 inserted through the openings 32 from the front side of the bumper crossmember 1 in the area of the projections. FIG. 5 shows a cross section through the bumper crossmember 1.1 in its contact section, looking in the direction toward the extension section 14.1.

Figure 6:
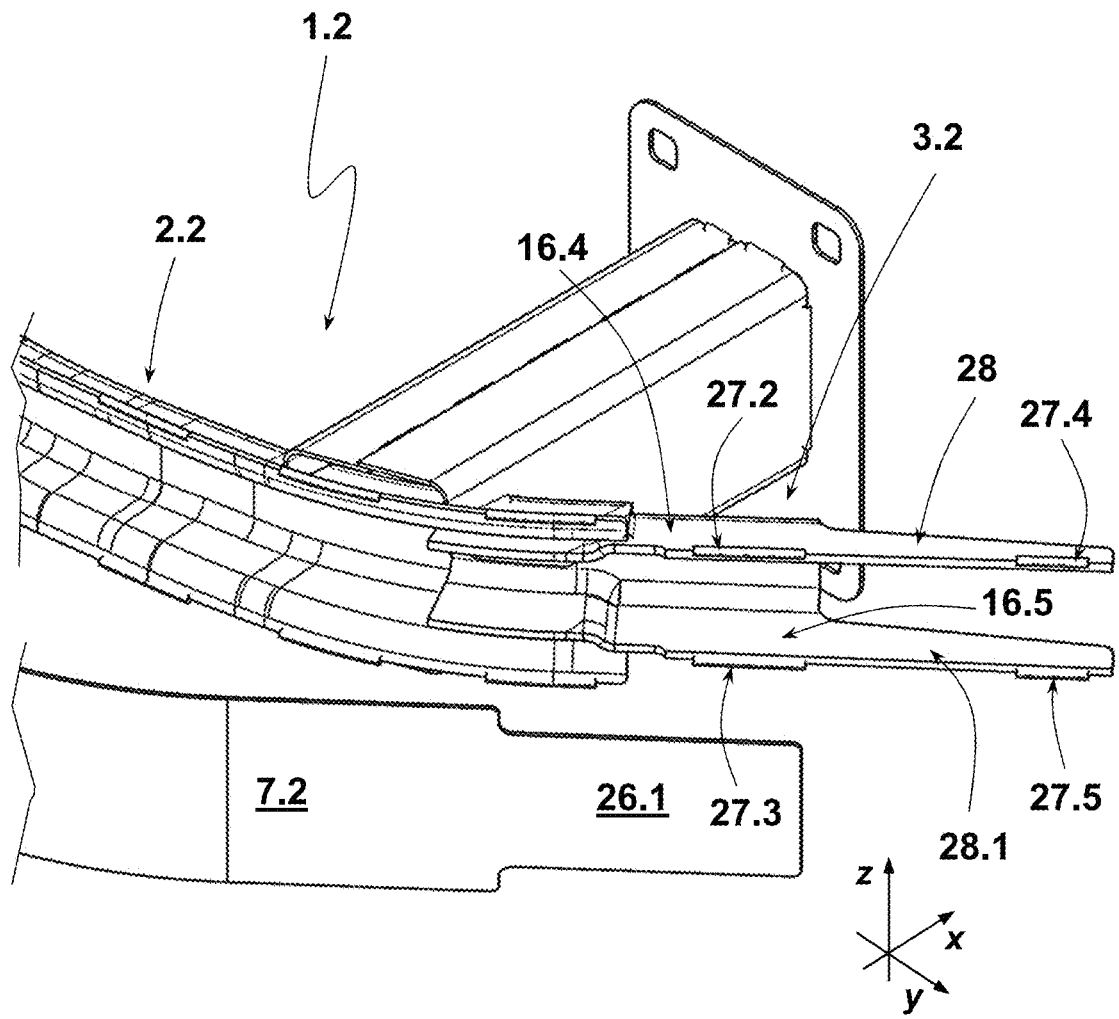
FIG. 6 shows a perspective view of a third embodiment of the bumper crossmember.

FIG. 6 shows a third example embodiment of a bumper crossmember 1.2. This corresponds in its basic structural design to the example embodiments from FIGS. 4 and 5. This bumper crossmember 1.2 differs from the bumper crossmember 1.1 in the design of the extension section 14.2 of its widening element 3.2. No additional extension element is provided in the bumper crossmember 1.2. An additional extension is provided by two support arms 28, 28.1 continuing the legs 16.4, 16.5. These support arms 28, 28.1 extend the legs 16.4, 16.5 in the y direction. In the area of the support arms 28, 28.1, the widening element 3.2 has no profile base. In addition to the leg-extending projections 27.2, 27.3 of the extension section 14.2, projections 27.4, 27.5 that also increase the height of the support arms 28, 28.1 are formed thereon. The closing plate 7.2 has a tab 26.1 that is extended in relation to the tab 26 of the bumper crossmember 1.1. The width of the tab 26.1 extending in the vertical direction (z direction) in the installed position corresponds to the spacing of the projections 27.2, 27.3 or 27.4, 27.5 from one another in the z direction. By engaging the tab 26.1 between these projections 27.2, 27.3 or 27.4, 27.5, the closing plate 7.2 is fixed between them in the z direction. The root of the tab 26.1 borders against the terminus of the projections 27.2, 27.3 facing toward the carrier profile 2.2.

FIG. 7 shows the example embodiment from FIG. 6 in a horizontal section.

In all the example embodiments, the connection between the carrier profile 2, 2.1, 2.2 and the respective widening element 3, 3.1, 3.2 takes place via the respective fitting section 13, in that the legs 16, 16.1, 16.2, 16.3 of the widening element 3, 3.1, 3.2 abut the legs 9, 9.1 of the carrier profile 2, 2.1, 2.2 in the area of the fitting section 13. This abutting can take place with a certain pre-tension, so that the fitting section 13 is clamped in the profiling of the carrier profile 2, 2.1, 2.2. In this area, the end terminal of the profile base 10, 10.1 of the carrier profile 2, 2.1, 2.2 is preferably welded to the profile base 15, 15.1 of the widening element 3, 3.1, 3.2. This forms a first connection point between the respective widening element 3, 3.1, 3.2 and the carrier profile 2, 2.1, 2.2.

The second connection point between the carrier profile 2, 2.1, 2.2 and the widening element 3, 3.1, 3.2 is located in all example embodiments between the respective contact section 12 and the profile base 15, 15.1 of the carrier profile 2, 2.1, 2.2. In all of the example embodiments, the connections are designed as welded connections. Moreover, all example embodiments have a slot-like recess 30 in the area of the contact section 12 of the widening element 3, 3.1, 3.2 (see FIG. 1). The welding between the contact section 12 and the profile base 10, 10.1 of the carrier profile 2, 2.1, 2.2 takes place in all example embodiments in the area of the recess 30 and at the front terminus of the profile base 15 of the connection section 11.

In one example embodiment (not shown in the figures), it is provided that the profile base of the connection section is bent at the end facing toward the carrier profile in the direction toward the profile base of the carrier profile and this bent projection engages in a prepared recess in the profile base of the carrier profile. Such a measure results in the widening element being fixed in relation to the carrier profile. Such an embodiment can be used when no tolerances in the y direction need to be compensated for.

The invention has been described on the basis of example embodiments. Without departing the scope of the claims, numerous further options and possibilities for implementing the invention result for a person skilled in the art, without having to explain or show them in greater detail in the context of this disclosure.

| List of reference numerals | |
|---|---|
| 1, 1.1, 1.2 | bumper crossmember |
| 2, 2.1, 2.2 | carrier profile |
| 3, 3.1, 3.2 | widening element |
| 4 | extension element |
| 5 | crash box |
| 6 | mounting plate |
| 7, 7.1, 7.2 | closing plate |
| 8 | end area |

List of reference numerals

| Numeral | Description |
|---|---|
| 9, 9.1 | leg |
| 10, 10.1 | profile base |
| 11 | connection section |
| 12 | contact section |
| 13 | fitting section |
| 14, 14.1, 14.2 | extension section |
| 15, 15.1 | profile base |
| 16.1, 16.2, 16.3, 16.4, 16.5 | legs |
| 17 | outside legs widening element |
| 18 | inside legs carrier profile |
| 19 | spacing |
| 20 | transition section |
| 21 | outside profile base connecting element |
| 22 | inside profile base carrier profile |
| 23 | free ends carrier profile |
| 24 | free end leg |
| 25 | end face of crash box |
| 26, 26.1 | tab closing plate |
| 27.1, 27.2, 27.3, 27.4, 27.5 | projection |
| 28, 28.1 | support arm |
| 29 | weld seam |
| 30 | recess |
| 31 | material recess |
| 32 | opening |

The invention claimed is:

1. A bumper crossmember comprising:
a carrier profile with a longitudinal direction thereof extending in a vehicle transverse direction (y direction), the carrier profile having, at least at ends thereof, sections with a U-shaped profile in a vehicle height direction (z direction) formed by two legs and a profile base connecting the two legs, and
a widening element profiled in the z direction connected to each end of the carrier profile, via which the carrier profile is extended in the longitudinal direction (y direction),
wherein each widening element has a connection section with a U-shaped profile, the connection section having a contact section and a fitting section adjoining the contact section, and each widening element has an extension section adjoining the fitting section,
wherein the connection section has a profile base connecting two legs of the U-shaped profile and is engaged with one of the two U-shaped sections of the carrier profile and arranged overlapping therewith in the y direction,
wherein the connection section is connected to the profile base of the carrier profile at least in an area of the contact section,
wherein the fitting section of each widening element provides a fit for connection to the carrier profile,
wherein the legs of the connection section contact the legs of the carrier profile in a region of the fitting section at least in some areas, and
wherein the contact section of each widening element is only connected with the profile base thereof to the profile base of the carrier profile.

2. The bumper crossmember of claim 1, wherein the legs of the connection section in the region of the fitting section are each in contact with an outside thereof with an inside of the legs of the carrier profile, and an outside of the profile base of the connection section facing toward the profile base of the carrier profile is connected to the profile base of the carrier profile in the contact section.

3. The bumper crossmember of claim 2, wherein the profile base of the connection section is also connected to the profile base of the carrier profile in the region of the fitting section.

4. The bumper crossmember of claim 1, wherein the legs of the contact section of the connection section engaging in the U-shaped profile of the carrier profile are, at least up to an adjacent transition area, spaced apart from the legs of the carrier profile.

5. The bumper crossmember of claim 1, wherein the connection section has a slot-like recess following a longitudinal extension thereof (y direction) in a region of the contact section.

6. The bumper crossmember of claim 5, wherein the contact section is welded in the recess to the profile base of the carrier profile.

7. The bumper crossmember of claim 1, wherein a free end face of the contact section is welded to the profile base of the carrier profile.

8. The bumper crossmember of claim 1, wherein the U-shaped profile of the carrier profile is designed as a hat profile with flanges formed on the two legs, wherein the legs of the U-shaped profile of the connection section of the widening element extend to a plane of the flanges, and wherein the carrier profile is closed with a closing plate, and the closing plate is joined with the flanges of the carrier profile and at least in sections with the legs of the widening element.

9. The bumper crossmember of claim 1, wherein the widening element has a greater leg height in relation to the U-shaped profile in the extension section, at least in one or more leg sections, than in the fitting section, and wherein the height of the legs in the one or more leg sections of the widening element is flush with a terminus of the carrier profile on an open profile side thereof.

10. The bumper crossmember of claim 9, wherein projections, which extend the leg height, are formed on the one or more leg sections aligned with the terminus of the carrier profile, and the projections either extend laterally to a section of a closing plate located therebetween or engage in corresponding openings formed in the closing plate.

11. The bumper crossmember of claim 1, further comprising an additional extension element arranged on each widening element opposite the carrier profile.

12. The bumper crossmember of claim 1, wherein the extension section of the widening element has two support arms arranged spaced apart from one another in the z direction and extending from the legs of the widening element in the longitudinal direction away from the carrier profile.

13. The bumper crossmember of claim 1, wherein two crash boxes spaced apart from one another in the y direction are connected to the carrier profile and the contact section of each widening element is arranged at least partially overlapping with an end face of a crash box.

14. The bumper crossmember of claim 1, wherein the widening element has a predetermined buckling point in an area of the extension section which, when a predetermined holding force is exceeded, is configured to allow a buckling movement in the y direction of an outer part of the extension section relative to an inner part of the extension section around a buckling axis aligned in the z direction.

15. A vehicle having at least one bumper crossmember according to claim 1.

* * * * *